United States Patent
Macbeth et al.

(10) Patent No.: US 6,999,289 B2
(45) Date of Patent: Feb. 14, 2006

(54) ARC FAULT CIRCUIT INTERRUPTER WHICH DETECTS THE CESSATION OF ARCS OF AN ARC FAULT

(75) Inventors: Bruce F. Macbeth, Syracuse, NY (US); Jeffrey C. Richards, Baldwinsville, NY (US); James P. Romano, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 396 days.

(21) Appl. No.: 10/291,044

(22) Filed: Nov. 8, 2002

(65) Prior Publication Data

US 2003/0099070 A1    May 29, 2003

Related U.S. Application Data

(60) Provisional application No. 60/344,457, filed on Nov. 9, 2001.

(51) Int. Cl.
*H02H 3/00*    (2006.01)
*H02H 7/00*    (2006.01)

(52) U.S. Cl. .................................................. 361/5
(58) Field of Classification Search ................ 361/42, 361/5, 43, 44; 324/536, 546
See application file for complete search history.

(56) References Cited

U.S. PATENT DOCUMENTS

| | | | | |
|---|---|---|---|---|
| 4,376,243 A | * | 3/1983 | Renn et al. | 219/514 |
| 5,223,795 A | * | 6/1993 | Blades | 324/536 |
| 5,280,404 A | * | 1/1994 | Ragsdale | 361/113 |
| 5,432,455 A | * | 7/1995 | Blades | 324/536 |

* cited by examiner

*Primary Examiner*—Brian Sircus
*Assistant Examiner*—Zeev Kitov
(74) *Attorney, Agent, or Firm*—Bond, Schoeneck & King PLLC; Daniel P. Malley

(57) ABSTRACT

An arc fault circuit interrupter which protects an AC circuit subjected to a possible arcing fault includes a sensor which produces a signal that can be evaluated to see if it is associated with arc fault current. The evaluation is done by a discrimination circuit which identifies a characteristic of the sensor signal associated with cessations of the arc fault current. An accumulator counts the number of occurrences of the cessations, and if the number of cessations counted within a predetermined time interval exceeds a predetermined number, the arc fault circuit interrupter interrupts the AC circuit.

39 Claims, 3 Drawing Sheets

ARC FAULT CIRCUIT INTERRUPTER WHICH DETECTS THE CESSATION OF ARCS OF AN ARC FAULT

CROSS-REFERENCE TO RELATED APPLICATIONS

This application claims priority from U.S. Provisional Application Ser. No. 60/344,457 filed Nov. 9, 2001 and entitled AFCI WHICH DETECTS THE CESSATION OF ARCS OF AN ARC FAULT, incorporated herein by reference.

FIELD OF THE INVENTION

This invention relates generally to the field of arc fault detectors and interrupters, and more particularly to an arc fault interrupter which ignores signal associated with arc make which is mimicked by phase controllers, while detecting and interrupting signal that is uniquely associated with arc cessation, in order to eliminate false operation of the arc fault interrupter.

BACKGROUND OF THE INVENTION

A percentage of fires each year are caused by electrical branch circuit wiring arcing faults involving currents below the trip level of a conventional circuit breaker or OCPD (over current protection device) as well as below the handle rating of the breaker. Basic overcurrent protection afforded by circuit breakers is designed to prevent $I^2R$ heating of the wiring in an electrical distribution system, which is typically caused by circuit overloading due to short circuits and not arcing faults. A true short circuit is a rarity in an electrical system. In fact, it is more accurate to think of electrical faults as being an arc fault with some level of impedance (low current) or with a low impedance (high current). Many electrical faults begin as high impedance breakdowns between the line and neutral conductors or between the line conductor and the ground wire or device components. AFCI (Arc Fault Circuit Interrupter) technology affords protection from conditions that may not necessarily be an immediate threat but could become hazardous if left unattended.

In order to start a fire, three elements must be present: fuel, oxygen (air), and energy to ignite the fuel. Arcing is defined as a luminous discharge of electricity across an insulating medium. The electrical discharge of an arc can reach temperatures of several thousand degrees Celsius. Arcing produces sufficient energy to reach the ignition point of nearby combustible material(s) before a circuit breaker can respond. Arc detection is an enhancement to thermal magnetic overload detection typically used in circuit breakers or OCPD's, which alone usually do not detect and respond to arc faults.

There are different types of arc faults such as those that are known as "A-type" which occur across a break in the line or neutral conductors or at a loose terminal in a branch circuit of a distribution network. The conductors are carrying current to a load derived from the line voltage. The arc could likewise occur as a break in the conductors or at a loose terminal associated with an extension cord deriving power from line voltage, thereby completing the circuit to the load. Since the current through the A-type fault is limited by the impedance of the load itself, i.e., because the fault is in series with the load, an A-type fault is also known as a "series fault."

"B-type" arc faults are a second arcing condition. In a B-type fault, the arc occurs between two conductors in the branch circuit or extension cords plugged into it, at a site where the insulating media separating the two conductors has been compromised, e.g., by a staple penetrating the middle of an extension cord causing part of the insulation between the conductors to be nullified. The arc may occur across the line and neutral conductors or the line and ground conductors, or in the case of reverse polarity where the line voltage is reverse-polarized, between the neutral and ground conductors. The current through the B-type fault is not limited by the impedance of the load, but rather by the available current from the supply, as established by the impedance of the conductors and terminals between the source of line voltage and the position of the parallel fault, i.e., the conductive members carrying the current. Since B-type faults are effectively across the line, they are also known as "parallel faults."

A primary problem in AFCI design is identifying an arc fault, such as A-type or B-type arc faults, without falsely identifying normal loads, such as phase controllers such as light dimmers that commonly employ a solid state switching device such as a triac. These devices tend to mimic certain characteristics of arc faults. The user varies the current delay angle of the switching device, which is the particular phase angle on each half cycle of the line voltage when the switching device becomes abruptly conductive. Once the switching device is conductive, the light or other controlled load is electrically connected to the line voltage for the remaining portion of the half line cycle, at which time the instantaneous current through the controlled load is at or near zero and the switching device turns off. The process of the switching device turning on at the current delay angle and turning off the end of the half cycle is repeated for subsequent half cycles. Each time the switching device turns on there is a high rate of change of current through the controlled load. The repetitive abrupt appearance of current is not unlike the behavior of arcing faults, wherein a sufficient instantaneous line voltage is necessary in order for the arc to strike. The current through the arc fault abruptly commences when the arc is struck, producing a high rate of change of load current similar to the switching device turning on at the current delay angle.

There is a need for an arc fault circuit interrupter that improves upon prior art devices that have detected arc faults on the basis of changes in the current which are unable to distinguish between signals produced by arc faults from those produced by phase controllers such as light dimmers. Methods have been devised that try to distinguish the two origins of changes in the current, for example, on the basis of the steepness of the edge of the first derivative of the current, i.e., the current di/dt, and on di/dt pulse amplitude or repetition rate patterns, but an AFCI using these methods is still prone to either a failure to detect and interrupt a true arc fault hazard or prone to false interruption due to phase controllers depending on the chosen sensitivity of the AFCI's detector.

SUMMARY OF THE INVENTION

Briefly stated, an arc fault circuit interrupter which protects an AC circuit subjected to a possible arcing fault includes a sensor which produces a signal that can be evaluated to see if it is associated with arc fault current. The evaluation is done by a discrimination circuit which identifies a characteristic of the sensor signal associated with cessations of the arc fault current. An accumulator counts the number of occurrences of the cessations, and if the number of cessations counted within a predetermined time interval exceeds a predetermined number, the arc fault circuit interrupter interrupts the AC circuit.

According to an embodiment of the invention an arc fault detector for protecting a circuit on an AC power line for distribution of an electrical current to a circuit includes a sensor for sensing step transitions in the current; a discriminator receiving an output from the sensor and providing an output signal in response to a portion of sensed step transitions having proper polarity; and an accumulator that receives signal from the discriminator and that counts the portion of step transitions for a first predetermined time interval; wherein the accumulator is responsive to the count exceeding a first predetermined number.

According to an embodiment of the invention, an arc fault detector includes detection means for detecting an arc fault rate of current change in an electrical current delivered from an AC power source, wherein a polarity of the arc fault rate of current change is opposite to a polarity of the electrical current containing the arc fault rate of current change; gate means for permitting acceptance of the arc fault rate of current change during one or more predetermined intervals of one or more cycles of the AC power source into an accumulator; determining means for determining when an accumulation of the accepted arc fault rate of current changes in the accumulator in a predetermined pattern, and during a predetermined time interval; and signaling means, responsive to the determining means, for signaling a circuit interrupter to interrupt the electrical current.

According to an embodiment of the invention, an arc fault circuit interrupter for protecting an AC circuit subjected to a possible arcing fault includes a sensor for producing a signal associated with the arc fault current; a discrimination circuit for identifying a characteristic of the sensor signal associated with cessations of the arc fault current; and an accumulator for counting a number of occurrences of the cessations; in which when the number of cessations exceeds a first predetermined number during a first predetermined time interval, the arc fault circuit interrupter is caused to interrupt the AC circuit.

According to an embodiment of the invention, an arc fault detector for detecting arc faults which have an associated electrical current in an AC power line includes means for sensing said electrical current; and means for detecting step changes in said electrical current indicative of arc cessation.

According to an embodiment of the invention, a method for detecting arc faults that have an associated electrical current in an AC power line includes the steps of sensing said electrical current; and detecting step changes in said electrical current indicative of arc cessation.

DETAILED DESCRIPTION OF THE PREFERRED EMBODIMENT

Since both types of changing currents, also referred to herein as di/dt, are associated with current initiation, they are designated "start di/dt." Although the term "di/dt" usually means the first derivative of the current, as used herein the term also encompasses step increases and step decreases of the current. An arc fault detector according to an embodiment of the invention ignores start di/dt associated with phase controllers to prevent false interruption and consequently ignores indistinguishable start di/dt associated with arc faults. Arc faults are detected and interrupted when cessation di/dt is detected. Cessation di/dt occurs at a phase angle typically late in the half cycle of the line voltage where the instantaneous line voltage has diminished to a value where the arcing current is no longer sustainable. The arc fault current abruptly ceases and produces cessation di/dt thereby. By comparison, the switching device in a phase controller turns off at or near the current zero crossing where there is little or no load current, and although the turn-off is abrupt, there is little or no associated cessation di/dt. Thus, the arc fault detector detects the di/dt signal that is unique to arc faults and ignores the di/dt signal that is produced by phase controllers, thereby reducing or eliminating false detections.

Another differentiating feature of arc fault cessation di/dt over phase controller start di/dt is that arc cessation di/dt is always of the opposite polarity to phase controller start di/dt in a given half cycle of line current. This allows differentiation of phase controller start di/dt, which can occur near the end of the current half wave when a user selects a low bulb brightness, from arc cessation di/dt which always occurs near the end of the half cycle of current. In another aspect of the invention, the arc fault circuit interrupter ignores a certain band of phase angles in half cycles of the line voltage in order to prevent false interruption by the circuit interrupter. The phase angle band does not contain cessation di/dt expected from arc faults, but may contain cessation di/dt produced by caused by safe loads that produce arcing during normal operation, for example, motors having commutators and brushes.

Figure 1:
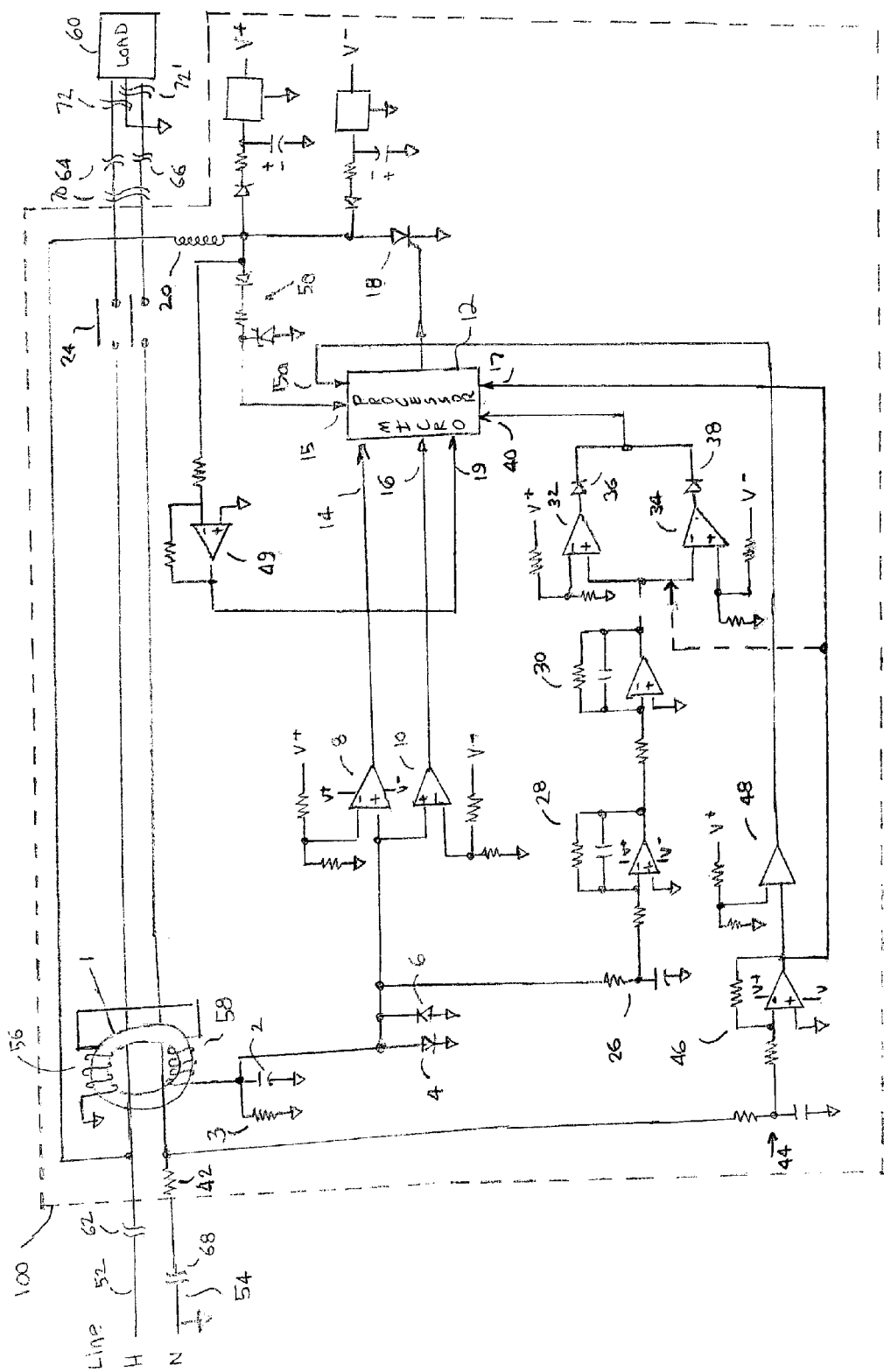
FIG. 1 shows a schematic circuit diagram of an embodiment of the present invention.

Referring to FIG. 1, an arc fault circuit interrupter (AFCI) 100 for protecting a circuit is shown. The circuit includes a hot conductor 52, a neutral conductor 54, and a load 60. Conductors 52 and 54 receive line voltage from an AC power source. The frequency of the AC power source is typically, but not limited to, 50 or 60 Hz. For example, some specialized applications requiring excellent frequency stabilization use 400 Hz electricity. Upon detection of an arc fault condition, a set of interrupting contacts 24 open the circuit to disconnect load 60 from the line voltage.

Conductors 52 and 54 may have an electrical discontinuity caused by such things as a loose twist-on wire connector, a loose terminal screw, a loose plug, or a frayed cord set or the like, which can result in a series arc fault when current through load 60 flows through the discontinuity. Discontinuities where series arc faults can occur are shown at locations 62 and 68 on the line side of AFCI 100 and at locations 64 and 66 on the load side of AFCI 100. Locations where parallel arc faults can occur, for example where electrical insulation is compromised by an overdriven staple, are shown at location 70, which shows a parallel arc fault across hot conductor 52 and neutral conductor 54, and a location 72, which shows a parallel arc fault across hot conductor 52 and a nearby ground. An arc fault may occur at a location 72' if the hot and neutral conductor polarity happens to be reversed.

It is the function of an AFCI to discern the signatures unique to arc faults, whether series or parallel, and to interrupt the current flow through these faults before the intense energy associated with the arc current produces an electrical fire. In particular, since parallel arc faults are not limited by a load impedance, parallel faults are of higher current and higher energy, so it may be desirable to interrupt parallel arc faults faster than series arc faults. For purposes of this invention, the interruption of load current by AFCI 100 refers to the interruption of current through load 60 and consequently the series arc fault locations 64, 66, 62, and 68, as well as the interruption of current through the parallel arc fault locations 70, 72, and 72'.

In this embodiment, a sensor 1 is a transformer, typically ferrite, with two windings. A winding 56 senses electrical current in hot conductor 52, whereas a winding 58 senses electrical current in neutral conductor 54. Windings 56 and 58 are preferably series connected for signal adding. The electrical current in conductors 52, 54 includes the current through load 60 which is at the frequency of the line voltage. If there is a series arc fault at locations 62, 64, 66, or 68, or a parallel arc fault at locations 70, 72 or 72', the electric currents in either conductor 52 or 54, or both, includes step transitions. A step transition indicative of a series arc fault is an increase or decrease in current exceeding 2 A. A step transition indicative of a parallel arc fault is an increase or decrease in current exceeding 50 A. If load 60 includes a phase controller, there are step transitions in the sensed current as previously described. Sensor 1, as with all voltage transformers, differentiates the electrical current signal, thereby accentuating the high frequency components associated with step transitions compared to the 60 Hz component, and producing a di/dt signal in the form of a voltage pulse that corresponds with each step transition.

The polarity of the di/dt signal is indicative of whether the step transition is due to a step increase or a step decrease in the sensed electrical current. A capacitor 2 is used to lower and set the resonant frequency of sensor 1, while a resistor 3 is used to dampen ringing. Diodes 4 & 6 are di/dt clamps used to suppress signals which may damage comparators 8 and 10, with comparators 8 and 10 being set to produce output signal if the magnitude of either the plus or minus di/dt signals is greater than a predetermined magnitude. The outputs of comparators 8 and 10 are inputs 14 and 16, respectively, of microprocessor 12. A line voltage monitor 50 monitors the line voltage to AFCI 100 and provides signal to an input 15 of microprocessor 12. The signal at input 15 is used by microprocessor 12 to establish whether a particular di/dt signal is occurring in a positive or negative half cycle of the AC line voltage. Thus, line voltage monitor 50 is a polarity detector.

It is desirable to distinguish arc faults from phase control loads having a triac, since both arc faults and triacs produce a start di/dt within the half cycle of the line voltage. However, the phase control load produces a minimal cessation di/dt as compared to the arc fault. Arc cessation di/dt occurs during a particular time interval of the half wave of the 50 or 60 Hz line frequency, i.e., about 5 milliseconds after the zero crossing. Arc-mimicking cessation pulses such as from a variable speed electric power drill may occur within 0.5 msec of the zero crossing. A predetermined detection time interval (DTI) for evaluating di/dt pulses may encompass the entire half cycle, or for improved discrimination of arc fault cessation pulses, may cover a portion of each half wave of the AC line frequency, such as between 5 msec and 7.8 msec after the zero crossing. The predetermined DTI is preferably set by microprocessor 12, which, within each DTI during the positive half cycle of current, counts negative di/dt pulses arriving at input 16 of microprocessor 12 while ignoring any positive di/dt pulses arriving at input 14 of microprocessor 12.

Likewise, any positive di/dt arriving at input 14 of microprocessor 12 during a predetermined DTI of each negative half wave of the line voltage is counted by microprocessor 12 while any negative di/dt pulses arriving at input 16 of microprocessor 12 are ignored. Thus di/dt pulses are identified as cessation di/dt pulses on the basis of their polarity with respect to the polarity of the line voltage. A negative di/dt pulse near the end of the positive half cycle of the line voltage and a positive di/dt pulse near the end of the negative half cycle of the line voltage are referred to herein as being of "proper" polarity. "Proper" also has the same meaning when applied to step transitions in the current. If M cessation di/dt pulses are counted during either the positive or negative half cycle polarities of the line voltage within a detection window of N number of half cycles, then the microprocessor 12 issues a trip command to SCR 18, which in turn activates trip solenoid 20 releasing interrupting contacts 24 and interrupting the load side current. M and N are experimentally predetermined constants chosen such that the arc fault circuit interrupter complies with the maximum permissible interruption times in Underwriters Laboratories standard for arc fault circuit interrupters, UL 1699, and also so that the arc fault circuit interrupter does not interrupt safe arcs, such as from toggling a snap switch under load, or from having a light bulb burn out.

The detection window may be opened when a detected proper polarity di/dt occurs in the DTI interval, or when more than one proper polarity di/dt occurs in one or more half cycles, or may be opened when a low frequency event in the load side current occurs, such as a step up or down in load current or a random variation of the current, or a similar low frequency event in the line voltage, or a low frequency event simultaneously in the load current and the line voltage. Events may be singular or in predetermined patterns, whatever suggests the presence of an arc fault. Predetermined patterns include low frequency arc fault patterns detectable from such methods as (a) PWM (pulse width modulation) wherein voltage or current is present for a portion of a half cycle of the line voltage and there is a fluctuation in the portion from half cycle to half cycle, (b) PPM (pulse position modulation) wherein there is a step change in load current or line voltage at a measured time interval from a line voltage or load current zero crossing and there is a fluctuation in the measured time interval from half cycle to half cycle, or (c) PAM (pulse amplitude modulation) wherein there is a fluctuation of the load current or line voltage from half cycle to half cycle.

A shunt resistor 42 in series with neutral conductor 54 produces a signal proportional to the load current, so shunt resistor 42 is also known as a current view resistor. The signal from shunt 42 is sent to a low pass filter 44 to strip off high frequency broadband noise components. The signal from low pass filter 44 is amplified by an amplifier 46 whose output is connected to an ADC input 17 of microprocessor 12 for conversion to digital information by microprocessor 12. Likewise, the low frequency line voltage signal is taken from an amplifier 49 and converted to digital information by an ADC input 19 of microprocessor 12. Each ADC conversion of current and voltage is used to identify the low frequency arc fault patterns.

While the detection window is open, having been opened using one of the methods previously described, microprocessor 12 may simply search for and count proper polarity di/dt's, or search for random proper polarity di/dt's, randomness interpreted either in missing proper polarity di/dt's in some half cycles or in varying counts of proper polarity di/dt's during each half cycle, including zero, which counts vary from a given half cycle to a subsequent half cycle, or in varying counts of proper polarity di/dt's during non-subsequent half cycles which are also during the detection window. Microprocessor 12 may search for proper polarity di/dt's outside of the DTI and proper polarity di/dt's within the DTI during the detection window, and in particular for one or more proper polarity di/dt's in the DTI during one or more half cycles, followed by a predetermined quiet interval without proper polarity di/dt's in any half cycle, with the quiet period then followed by one or more cessation pulse di/dt's in the DTI during one or more half cycles during the remaining detection window. If a sufficient proper polarity di/dt count is not attained, or a sufficient proper polarity di/dt randomness is not discerned at the end of the Nth half cycle of the detection window, microprocessor 12 resets a counter, denoted M of N, and waits for another current or voltage event for re-opening the detection window.

For high current arc faults where the arc fault circuit interrupter must interrupt quickly, including parallel arc faults, an additional circuit is preferably added to AFCI 100. This additional circuit includes a passive low pass filter 26, a plurality of active low pass filters 28 and 30, a positive going signal detecting comparator 32, a negative going signal detecting comparator 34, a plurality of OR diodes 36 and 38, and a current zero cross comparator 48. This circuit is used for an arc fault detection speed up. A polarity detector such as a current zero cross comparator 48, which sends signal to an input 15a of microprocessor 12, can be used as an alternative to line voltage monitor 50 and input 15 of microprocessor 12, having the advantage of accurately identifying the proper polarity even when load 60 is inductive, the load current is phase shifted, and the voltage zero crossing is not coincident with the current zero crossing. During an arc fault, the output signal from sensor 1 includes larger di/dt signal associated with arcing that is imposed on a comparatively lesser 60 Hz signal associated with the load current. The 60 Hz signal is stripped of di/dt by filters 26, 28, and 30 and applied to comparators 32 and 34. The comparators are set to respond to a 60 Hz current of a predetermined high level above the circuit rating, suggestive of a parallel arc fault current, and whereupon the OR'd comparator 32 or 34 output signal is applied to an input 40 of microprocessor 12.

When a high current occurs that is sustained and thereby indicative of a parallel arc fault, comparators 32, 34 output a signal through OR diodes 36, 38 to microprocessor 12 for a duration sufficient to cause microprocessor 12 to enter a sped-up mode. The sped-up mode assures that microprocessor 12 acts on arriving di/dt of the proper polarity, and in the correct interval of the appropriate polarity half wave as described above, and outputs a signal to SCR 18 to engage trip solenoid 20 to open interrupting contacts 24 within approximately eight arcing half cycles after the arc fault has started, which is required by Underwriters Laboratories standard for Arc Fault Circuit Interrupters, UL1699. The speed-up may be accomplished by reducing the number M of proper polarity di/dt's during the detection window necessary for interruption, or by a simpler requirement for opening the window, such as opening upon the first detected proper polarity di/dt, or opening upon the first detected proper polarity di/dt residing within the DTI. When a high current is not sustained, such as when load 60 includes a motor or tungsten filament load having a momentarily high startup (inrush) current, the signals from comparators 32, 34 are not of sufficient duration to cause microprocessor 12 to enter the sped-up mode.

Alternately the 60 Hz fundamental signal can be taken from low resistance shunt 42, passed through low pass filter 44, and amplified by amplifier 46 before being applied to comparators 32, 34. The advantage of deriving signal from shunt resistor 42 instead of from sensor 1 is that large di/dt pulses are not produced that need to be stripped off by added circuitry, and the current zero cross signal from amplifier 46 is in phase with the line current.

Figure 2:
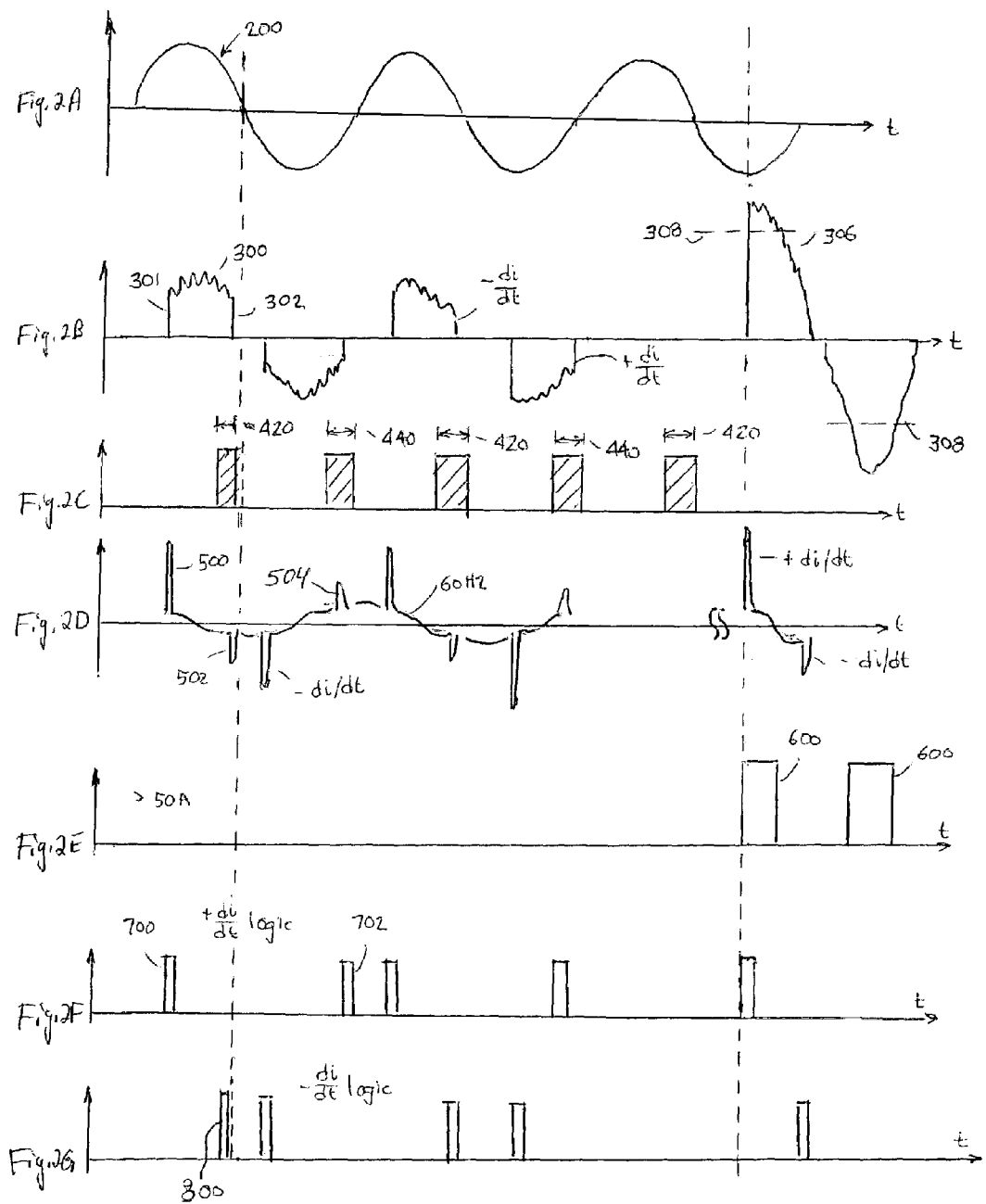
FIG. 2A shows a line voltage waveform as reference for the waveforms of FIGS. 2B–2G.
FIG. 2B shows the waveform for the arc fault current.
FIG. 2C shows the waveform for the rectified and clamped line for producing a zero cross reference.
FIG. 2D shows the waveform for the sensed arc fault di/dt.
FIG. 2E shows the waveform for the output of comparators 32 and 34 at microprocessor input 40.
FIG. 2F shows the waveform for the positive di/dt logic pulses.
FIG. 2G shows the waveform for the negative di/dt logic pulses.

Referring to FIGS. 2A–2G, when the arc fault starts, a step in current such as 301 occurs causing a positive di/dt pulse 500 in FIG. 2D at the sensor 1 output. The positive di/dt pulse also causes a positive di/dt logic pulse 700 in FIG. 2F in the comparator 8 output signal to input 14 of microprocessor 12. When the arc fault current ceases, or extinguishes, near the end of the given half cycle, a step down in current such as 302 in FIG. 2B occurs, causing negative di/dt pulse 502 in FIG. 2D and negative di/dt logic pulse 800 in FIG. 2G in the output signal of comparator 10 which is input 16 of microprocessor 12. The DTI acceptance band 420 in FIG. 2C is set by microprocessor 12 in a region near to or including the zero cross transition near the proper end of the half cycle, and preferably referenced to the voltage zero cross, in which a negative di/dt cessation pulse from sensor 1, which causes a negative di/dt logic pulse at input 16 of microprocessor 12 and that resides within the acceptance band, is accepted and counted by microprocessor 12.

Likewise, another acceptance band 440 in FIG. 2C occurring during the negative half cycle of the AC line voltage is set by microprocessor 12 for accepting and counting the positive di/dt arc cessation pulse 504 in FIG. 2D which causes a logic positive di/dt pulse 702 in FIG. 2F at input 14 of microprocessor 12. Arc fault pulse 306 in FIG. 2B shows a high current pulse caused by a circuit current above the circuit rating which passes through a pre-determined level 308 corresponding to a 50A circuit current. This causes a pulse 600 in FIG. 2E at input 40 of microprocessor 12, indicating a high circuit current, in this case greater than 50A. If pulse 600 is sufficiently wide or repetitive, representing sustained overcurrent, this causes microprocessor 12 to decrease the M of N requirement for speedy arc interruption.

The zero cross signal is preferably derived from the line voltage via the line voltage monitor circuit 50. Alternately, the current zero cross at input 15a of microprocessor 12, taken from comparator 48, can be compared to the voltage zero cross for determining phase shift. In this way, the acceptance windows 420 and 440 can be offset through the voltage zero cross in order to follow and cover the interval of expected arc cessation di/dt during a phase shifted current. The phase shift may be determined, and held, by microprocessor 12 in a constantly updated phase shift memory before an arc fault occurs, so that during an arc fault, when the current zero cross is affected by the arc fault, the di/dt acceptance window 420 and 440 locations in the half wave can be determined from the phase shift memory, with the locations held in the expected arc cessation interval.

Figure 3:
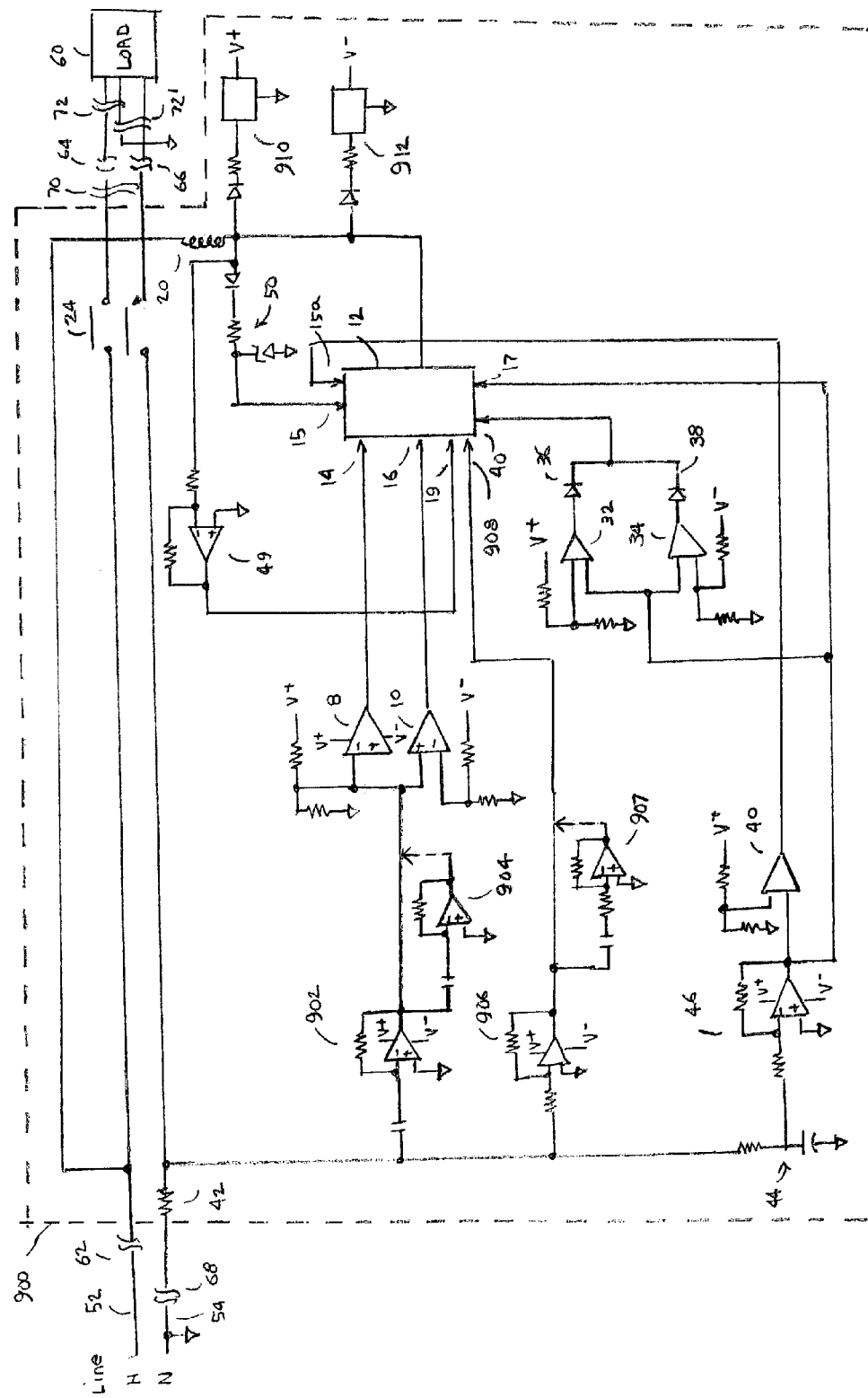
FIG. 3 shows a schematic circuit diagram of an alternate embodiment of the present invention.

FIG. 3 is circuit schematic of an alternative embodiment showing an arc fault circuit interrupter 900, wherein electrical components bearing like functions to those in FIG. 1 bear like designations. Sensor 1 in FIG. 1 senses and differentiates current step transitions occurring in conductors 52, 54, or both, providing di/dt pulse signal to comparators 8 and 10. The same functions are accomplished by shunt 42 which also detects step transitions in the load current, but a differentiator 902 is required to convert the step transitions into di/dt pulse signals. Differentiator 902 is in turn coupled to the inputs of comparators 8 and 10. The polarity of the di/dt pulse is indicative of whether the step transition in load-side current is a step increase or a step decrease. In another alternative embodiment, the output of differentiator 902 is coupled to a second differentiator 904 which in turn provides the input signal to the inputs of comparators 8 and 10. Second differentiator 904 transforms the di/dt pulse at its input into a pulse doublet at its output. The polarity of the leading edge of the pulse doublet is indicative of whether the particular step transition in sensed current is a step increase or a step decrease. The pulse doublet amplitude, if greater than the thresholds of comparators 8 and 10, produces signals at both inputs 14 and 16, respectively, of microprocessor 12. Microprocessor 12 continuously strobes inputs 14 and 16 in order to determine leading edge polarity. The benefit of second differentiator 904 is to further emphasize the high frequency signal associated with the transition step to aid discernment of step transitions from line frequency components in the sensed current.

In yet another embodiment, the signal from shunt 42 is amplified by an amplifier 906 which is connected to an input 908 of microprocessor 12 and converted by microprocessor 12 to digital information, whereby microprocessor 12 is able to directly discern step transitions. Amplifier 906 can be connected to a high pass filter 907 which in turn is connected to input 908 of microprocessor 12 to reduce the line frequency component of the load side current sensed by resistor 42 to improve step transition discernment. Although the embodiment is shown with shunt 42 located in neutral conductor 54, the shunt could also be included in the hot conductor.

The aforementioned embodiments are powered by a positive DC supply 910 and a negative DC supply 912, but negative DC supply 910 can be omitted from all or a portion of components in arc fault circuit interrupter 900 in order that the device be active during only one polarity of the AC power line and active only for sensing the polarity of the load step associated with arc fault cessation. Load steps associated with phase controllers produce the opposite load step polarity and are ignored.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. An arc fault detector for protecting a circuit on an AC power line for distribution of an electrical current to a circuit, comprising:
   at least one sensor coupled to the AC power line, the sensor being configured to provide a sensor output signal;
   a detection circuit coupled to the at least one sensor, the detection circuit being configured to detect a current step transition from the sensor output signal;
   a processing circuit configured to determine whether the current step transition represents an arc cessation event, and provide a discriminator output pulse when the current step transition represents an arc cessation event, whereby arc initiation events are ignored by the discriminator; and
   an accumulator configured to increment a count for each discriminator output pulse received during a first predetermined time interval, the accumulator providing a detection signal if the counter value exceeds a first predetermined number.

2. The device according to claim 1, further comprising an interrupting mechanism responsive to said accumulator, said interrupting mechanism being configured to interrupt said electrical current to said circuit in response to the detection signal.

3. The device according to claim 1, wherein said AC power line consists of a plurality of conductors, and wherein said sensor is coupled to at least one of said plurality of conductors.

4. The device according to claim 3, wherein said sensor consists of a shunt resistor.

5. The device according to claim 1, wherein the processing circuit is configured to identify a predetermined pattern of said step transitions exceeding said first predetermined number of said step transitions within said first predetermined time interval.

6. The device according to claim 1, wherein said detection circuit comprises:
   a zero cross detector for detecting the given polarity of at least one of a power line voltage or said electrical current; and
   a current step directional detector for identifying if said step transition in said electrical current is a step increase or a step decrease;
   wherein said processing circuit determines which current step transitions are to be counted by said accumulator depending on a polarity of said power line voltage at a time of said step transition increase or step transition decrease in said electrical current.

7. The device according to claim 6, further comprising a gate that prevents step transition changes in said electrical current from being counted by said accumulator that occur within designated portions of half cycles of said power line voltage.

8. The device according to claim 7, wherein said gate prevents step transition changes in said electrical current occurring at current or voltage zero crossings identified by said zero cross detector from being counted by said accumulator.

9. The device according to claim 7, wherein said gate prevents step transition changes in said electrical current during a first 5 milliseconds of each half cycle of said power line voltage or said electrical current from being counted by said accumulator.

10. The device according to claim 1, further comprising:
   differentiation means for differentiating said output from said sensor to produce di/dt signals in response to step transition increases or step transition decreases in said electrical current and wherein said di/dt signals have polarity; and
   a polarity detector for detecting a polarity of at least one of power line voltage and said electrical current;

wherein said processing circuit receives a signal from said differentiation means and a zero cross detector and allows only di/dt pulses, indicative of electrical current step transitions, to be counted by said accumulator that are of a proper polarity in relationship to said polarity of at least one of said power line voltage and said electrical current.

11. The device according to claim 10, wherein said first predetermined time interval is initiated by a di/dt pulse of proper polarity with respect to one of said power line voltage and said electrical current polarity.

12. The device according to claim 10, further comprising a gate that prevents step transition changes in said di/dt pulses from being counted by said accumulator that occur within specified portions of each half cycle of said power line voltage.

13. The device according to claim 12, wherein said gate prevents di/dt pulses in said electrical current occurring at current or voltage zero crossings identified by said zero cross detector from being counted by said accumulator.

14. The device according to claim 12, wherein said gate prevents said di/dt pulses occurring during a first 5 milliseconds of each half cycle of said power line voltage or said electrical current from being counted by said accumulator.

15. The device according to claim 10, furthermore comprising a second differentiator for differentiating an output from said differentiation means to produce differentiated di/dt signals in response to step transition increases and step transition decreases in said electrical current and wherein said differentiated di/dt signals have an associative leading edge polarity in response to said step transition increases and decreases in said electrical current;
wherein said processing circuit receives an output from said second differentiator and said output from said polarity detector, and wherein said accumulator counts only those differentiated di/dt pulses whose leading edges are of proper polarity in relationship to said output from said polarity detector.

16. The device according to claim 1 wherein said first predetermined time interval is initiated by an arc-indicative event.

17. The device according to claim 16, further comprising:
a voltage monitor for monitoring a voltage from said AC power line;
means for determining randomness in at least one of said output from said sensor and said voltage monitored by said voltage monitor;
wherein said arc-indicative event is discerned from said randomness from at least one of said sensor and said voltage monitor; and
wherein said means for determining randomness includes using one of pulse width modulation (PWM), pulse position modulation (PPM), and pulse amplitude modulation (PAM) techniques.

18. The device according to claim 16 wherein said arc-indicative event is a step transition increase or a step transition decrease in said electrical current.

19. The device according to claim 1, further comprising:
a current sensor for sensing an amount of said electrical current; and
a threshold detector for determining if said output from said current sensor exceeds a predetermined threshold;
wherein said accumulator is responsive to said first predetermined number when said output is less than said predetermined threshold, and responsive to a second predetermined number when said output exceeds said predetermined threshold.

20. The device according to claim 19, wherein said first predetermined number is greater than said second predetermined number.

21. The device according to claim 1, further comprising:
a current sensor for sensing an amount of said electrical current;
a threshold detector for determining if said output from said current sensor exceeds a predetermined threshold;
wherein said first predetermined time interval is initiated by a first event if said output is less than said predetermined threshold, and initiated by a second event if said output exceeds said predetermined threshold.

22. The device according to claim 21, further comprising:
a voltage monitor for monitoring a voltage from said AC power line;
means for determining randomness in at least one of said output from said sensor and said voltage monitored by said voltage monitor;
wherein an arc-indicative event is discerned from said randomness from at least one of said sensor and said voltage monitor; and
wherein said means for determining randomness includes using one of pulse width modulation (PWM), pulse position modulation (PPM), and pulse amplitude modulation (PAM) techniques.

23. The device according to claim 21, wherein said second event includes an arc-indicative event consisting of a predetermined initiation pattern of said step transitions counted by said accumulator.

24. The device according to claim 21, wherein said first event includes an arc-indicative event indicated by a first initiation count of said step transitions counted by said accumulator, wherein said second event includes an arc-indicative event indicated by a second initiation count of said step transitions counted by said accumulator, and wherein said first initiation count exceeds said second initiation count.

25. The device according to claim 1, wherein said first predetermined time interval includes a plurality of half line cycles of voltage or current associated with said AC power line, wherein said step transitions fail to occur for a second predetermined time interval within said first predetermined time interval, and wherein said accumulator is responsive to said count exceeding a predetermined number only if said second predetermined interval is detected by said accumulator.

26. The device according to claim 1, wherein said first predetermined time interval is initiated by an arc-indicative event comprising momentary absence of sensed step transitions for a second predetermined interval.

27. The device according to claim 1, wherein said AC power line is connected to an inductive load, said device further comprising:
a phase shift detector that measures a phase shift related to said inductive load; and
a gate that prevents step transition changes in said electrical current from being counted by said accumulator that occur within specified portions of half cycles of said power line; and
wherein an output from said phase shift detector determines a position of said portions with respect to positions of zero crossings in said half cycles of said power line.

28. The device according to claim 27, further comprising:
a current zero cross detector for sensing current zero crossings in said electrical current through said inductive load; and a voltage zero cross detector for sensing voltage zero crossings in voltage on said AC power line;

wherein said phase shift detector determines said phase shift from output signals from said current and voltage zero cross detectors.

29. The device according to claim 1, wherein said sensor comprises a shunt, said device further comprising:
a first differentiator for differentiating said output from said sensor to produce di/dt signals in response to step transition increases and step transition decreases in said electrical current, wherein said di/dt signals have an associative polarity in response to said step transition increases and decreases said in electrical current; and
a polarity detector for detecting a polarity of said AC power line voltage or said electrical current;
wherein said processing circuit receives an output from said first differentiator and an output from said polarity detector, and wherein said accumulator counts only those di/dt signals that are of proper polarity in relationship to said output from said polarity detector.

30. The device according to claim 1, wherein said detection circuit and/or processing circuit includes a half wave gate for blocking said current step transitions from being counted by said accumulator that occur in a predetermined polarity of said power line voltage or said electrical current.

31. The device according to claim 30, wherein said half wave gate comprises a half wave power supply.

32. The device according to claim 30, wherein said detection circuit and/or processing circuit blocks said step transition signals of improper polarity from being counted by said accumulator.

33. The device according to claim 1, further comprising:
means for producing a signal proportional to a magnitude of said step transitions in said current; and
a threshold detector for producing said sensed step transitions when said signal exceeds a predetermined amplitude.

34. An arc fault detector, comprising:
detection means for detecting an arc fault rate of current change in an electrical current delivered from an AC power source, wherein a polarity of said arc fault rate of current change is opposite to a polarity of said electrical current containing said arc fault rate of current change;
gate means for permitting acceptance of said arc fault rate of current change during one or more predetermined intervals of one or more cycles of said AC power source into an accumulator;
determining means for determining when an accumulator of said accepted arc fault rate of current in said accumulator matches a predetermined pattern, during a predetermined time interval;
signaling means, responsive to said determining means, for signaling a circuit interrupter to interrupt said electrical current.

35. An arc fault circuit detector used in conjunction with an arc fault circuit interrupter for protecting an AC circuit subjected to a possible arcing fault, comprising:
a sensor for producing a signal associated with the arc fault current;
a discrimination circuit for identifying a characteristic of said sensor signal associated with cessations of said arc fault current; and
an accumulator for counting a number of occurrences of said cessations; in which when said number of cessations exceeds a first predetermined number during a first predetermined time interval, an output signal indicative of an arc fault is produced.

36. The device as in claim 35, wherein said output signal causes said arc fault circuit interrupter to interrupt said AC circuit.

37. The device as in claim 35, further comprising a circuit for detecting high current cessations associated with high arcing fault currents, wherein if said high current cessations exceed a second predetermined number over a second predetermined interval, said arc fault circuit interrupter is caused to interrupt said circuit in a sped up mode.

38. An arc fault detector for detecting arc faults which have an associated electrical current in an AC power line, comprising:
means for sensing said electrical current; and
means for detecting a current step transition from the means for sensing;
means for determining whether the current step transition is an arc cessation event or an arc initiation event, the means for determining being configured to ignore arc initiation events; and
means for counting arc cessation events during a predetermined time period and providing a detection signal when the number of counted arc cessation events exceeds a predetermined amount.

39. A method for detecting arc faults that have an associated electrical current in an AC power line, comprising the steps of:
sensing said electrical current; and
detecting a current step transition from the sensed electrical current: determining whether the current stern transition is an arc cessation event or an arc initiation event, the means for determining ignoring arc initiation events; and
counting arc cessation events during a predetermined time period and providing a detection signal when the number of counted arc cessation events exceeds a predetermined amount.

* * * * *